(12) United States Patent
Tullio et al.

(10) Patent No.: US 8,374,984 B2
(45) Date of Patent: Feb. 12, 2013

(54) SUGGESTING A TIME FOR LIVE COMMUNICATIONS AMONG A LARGEST POSSIBLE SUBSET OF USERS BASED ON PREVIOUS CONTENT-CONSUMPTION BEHAVIOR

(75) Inventors: Joseph C. Tullio, San Francisco, CA (US); Noel S. Massey, Carpentersville, IL (US)

(73) Assignee: Motorola Mobility LLC, Libertyville, IL (US)

( * ) Notice: Subject to any disclaimer, the term of this patent is extended or adjusted under 35 U.S.C. 154(b) by 506 days.

(21) Appl. No.: 12/783,959

(22) Filed: May 20, 2010

(65) Prior Publication Data

US 2011/0289037 A1 Nov. 24, 2011

(51) Int. Cl.
*G06F 17/00* (2006.01)
*G06N 5/02* (2006.01)

(52) U.S. Cl. .......................................................... 706/46
(58) Field of Classification Search ........................ None
See application file for complete search history.

(56) References Cited

U.S. PATENT DOCUMENTS

| | | | |
|---|---|---|---|
| 6,005,597 | A | 12/1999 | Barrett et al. |
| 6,286,140 | B1 | 9/2001 | Ivanyi |
| 6,438,752 | B1 | 8/2002 | McClard |
| 6,604,059 | B2 | 8/2003 | Strubbe et al. |
| 6,637,029 | B1 | 10/2003 | Maissel et al. |
| 6,947,935 | B1 | 9/2005 | Horvitz et al. |
| 7,490,122 | B2 | 2/2009 | Horvitz et al. |
| 2006/0026642 | A1 | 2/2006 | Schaffer et al. |

OTHER PUBLICATIONS

'Augmenting shared personal calendar': Tullio, 2002, UIST-02 October, ACM 1-58113-488, pp. 11-20.*
'Exploring the Design and Use of Forecasting Groupware Applications with an Augmented Shared Calendar': Tullio, 2005, Georgia Institute of Technology, © Joe Tullio.*
James "Bo" Begole et al., "Rhythm Modeling, Visualizations and Applications," Proceedings of the 16th Annual ACM Symposium on User interface Software and Technology, Vancouver, British Columbia, Canada, Nov. 2-5, 2003, pp. 11-20.
Eric Horvitz, et al., "Coordinate: Probabilistic Forecasting of Presence and Availability," Proceedings of the Eighteenth Conference on Uncertainty and Artificial Intelligence, Edmonton, Alberta, Canada, Jul. 2002. Morgan Kaufmann Publishers, pp. 224-233.

* cited by examiner

*Primary Examiner* — Kakali Chaki
*Assistant Examiner* — Peter Coughlan

(57) ABSTRACT

Disclosed is a method for making media consumption more social by suggesting a time when users in a group may engage in live communications while consuming media. First, media-consumption activities of the users in the group are monitored. (For example, the set-top boxes of a cable television system monitor when and what each user watches.) Then, from this and possibly from other information, times when each user will be available for live communications are predicted. Finally, the individual predictions are correlated and, if possible, a future time is suggested when a largest possible number of the users in the group will be available for live communications. Some embodiments use other information, such as electronic calendars, to predict when users may be available. The suggested time may be shown on an electronic program guide for a user watching television and may be added to each user's electronic calendar.

15 Claims, 4 Drawing Sheets

SUGGESTING A TIME FOR LIVE COMMUNICATIONS AMONG A LARGEST POSSIBLE SUBSET OF USERS BASED ON PREVIOUS CONTENT-CONSUMPTION BEHAVIOR

FIELD OF THE INVENTION

The present invention is related generally to monitoring consumption of electronic content and, more particularly, to enhancing social interactions.

BACKGROUND OF THE INVENTION

People are constantly being exposed to more and more types of electronic media content being delivered by differing types of media outlets. These outlets currently include, for example, television, radio, media playback devices (e.g., VCRs, DVRs, CD and DVD players), e-mail, text messaging, and web-based content (either live or cached).

Some people are finding, however, that the large amount of content available may tend to restrict their participation in social events. Rather than meeting with friends and family, for example, some people simply find it easier to watch television or listen to music by themselves.

To counteract this tendency, attempts have been made to "socialize" media-consumption activities. For example, two friends in separate locations may talk on the telephone while they watch a favorite television show. To promote shared viewing, some television providers support an on-screen "buddy list" that shows the current viewing status of the viewer's remotely located friends. Some people may even use electronic calendars (often provided as part of an e-mail system) to schedule times when friends can interact.

While useful as first steps, the current "social media" systems are, however, awkward to use, and they require significant effort from their users before they can properly enhance social interactions.

BRIEF SUMMARY

The above considerations, and others, are addressed by the present invention, which can be understood by referring to the specification, drawings, and claims. According to aspects of the present invention, media consumption is made more social by suggesting a time when users in a group may engage in live communications while consuming media. First, media-consumption activities of the users in the group are monitored. (For example, the set-top boxes of a cable television system monitor when and what each user watches.) Then, from this and possibly from other information, times when each user will be available for live communications are predicted. Finally, the individual predictions are correlated and, if possible, a future time is suggested when a largest possible number of the users in the group will be available for live communications.

In many embodiments, the members of the group are self-selecting, e.g., they are members of a social network.

Some embodiments use other information, such as electronic calendars, to predict when users may be available.

The suggested time for live communications may be presented to the users in the group along with such information as which members of the group are expected to be available and what content is suggested for consuming (possibly based on ratings of content assigned by members of the group). The suggested time may be shown on an electronic program guide for a user watching television and may be added to each user's electronic calendar.

When the suggested time arrives, a communication channel can be automatically opened that supports live communications among those users in the group who are predicted to be available.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
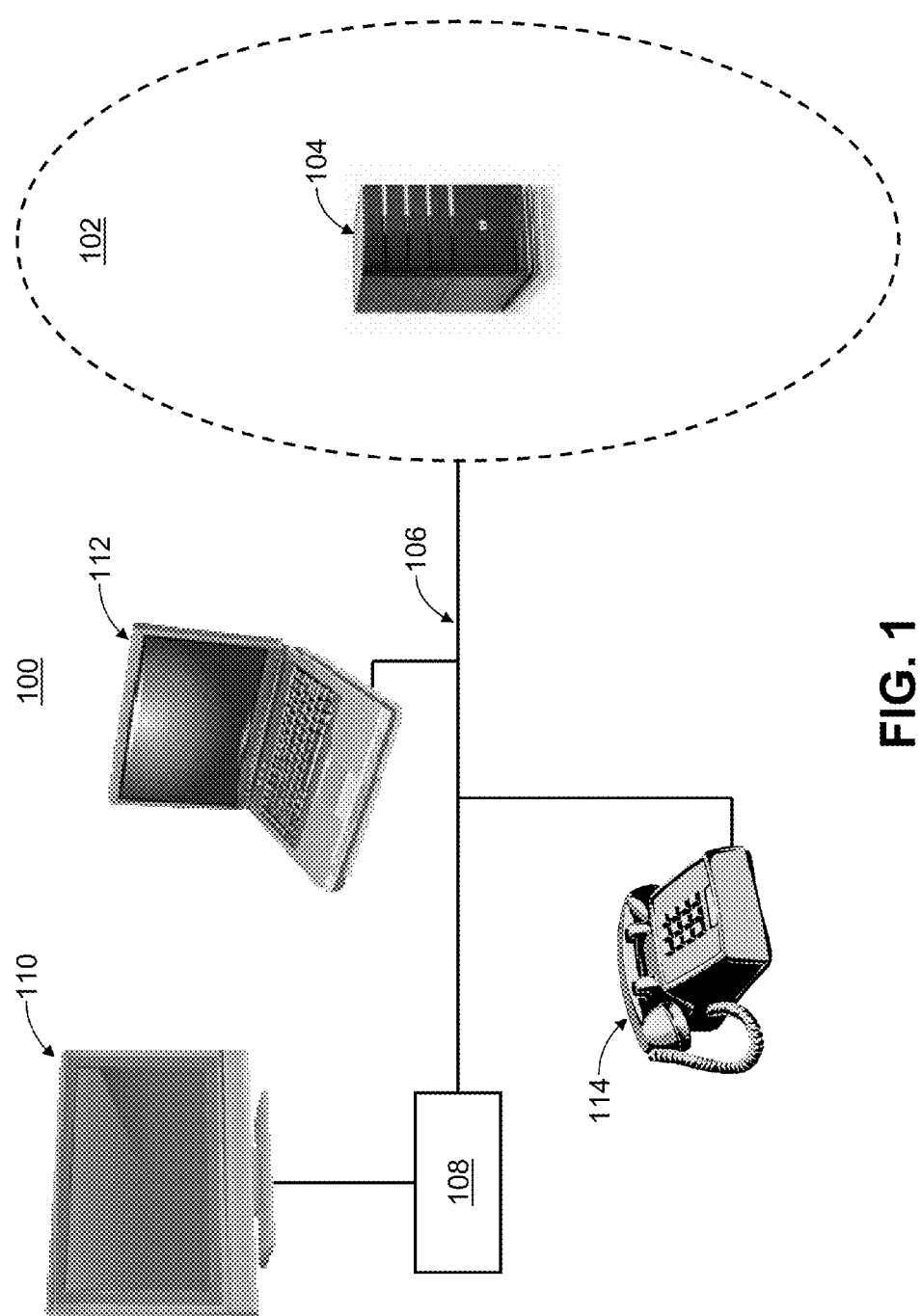
FIG. 1 is an overview of a representational environment in which the present invention may be practiced.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

To illustrate aspects of the present invention, this discussion focuses on ways of enhancing social interactions among users in a social group. Each user in the group is in an environment that supports both communications and media-consumption.

FIG. 1 presents one typical communications and media-consumption environment 100 for a user in the social group. This is a cable-television environment, wherein the cable operator provides head-end equipment 102 to connect the user's devices 110, 112, 114 to various communications and media-consumption services, including, for example, television, telephony, and Internet-based services. (The equipment at the head-end 102 can be very complex. That complexity is not important to the present discussion, so the head-end 102 is depicted in a simplified way by one server 104.) The head-end 102 is connected via a cable (coaxial or fiber optic) 106 to the user's premises. A set-top box 108 connects to the cable 106 and provides television services via a monitor 110. In other environments, communications and media-consumption services can be provided by satellite or wireless systems (e.g., cellular) instead of, or in addition to, the cable 106 of FIG. 1.

In some embodiments, other devices also use the cable infrastructure for communications. A laptop computer 112 is shown in FIG. 1 that uses the cable 106 to connect to the Internet. A telephone 114 access the Public Switched Telephone Network via the cable 106.

Users in the group may have communications and media-consumption environments that are similar to or completely different from the representative environment 100 shown in FIG. 1. For example, the environment of one user may include a cable television, a separate data line for Internet access, and a dedicated telephone line. In another example, a user's environment may consist solely of a cellphone. There is no expectation or requirement that the users in the group all have similar environments.

Figure 2:
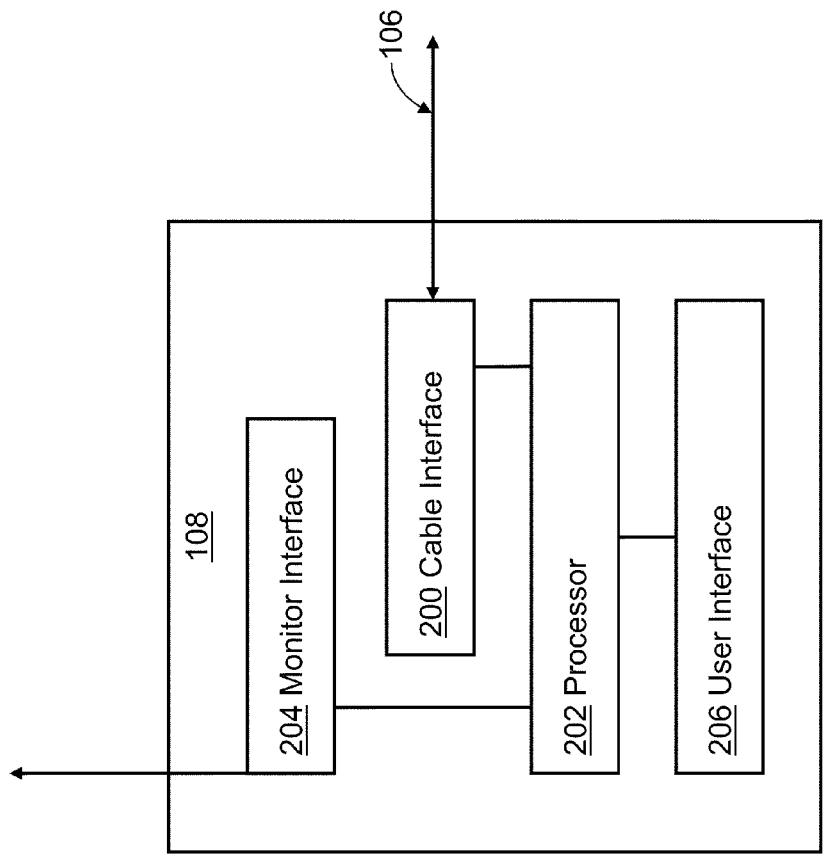
FIG. 2 is a schematic of a device for consuming content and for gathering information on a user's content consumption.

FIG. 2 shows the major components of a media-consumption device. While FIG. 2 is specifically directed toward the set-top box 108 of FIG. 1, it is easily generalized to other media-consumption and communications devices such as cellphones and personal computers 112. The set-top box 108 has a cable interface 200 connected to the cable 106 provided by the cable operator. Other devices support other communications interfaces such as DSL, cellular, WiFi, BlueTooth, and the like. A processor 202 controls the set-top box 108 and performs aspects of the method discussed below in reference to FIGS. 3a and 3b. The set-top box 108 is designed to drive an external monitor 110 via the monitor interface 204. In some other devices (e.g., a cellphone), the monitor is built into the device itself, so the interface 204 is all internal. The device 108 includes a user interface 206 that, on various devices, includes such features as a keyboard, mouse, touch screen, infrared remote receiver, and the like. All of this hardware is well known in the art.

Figure 3A:
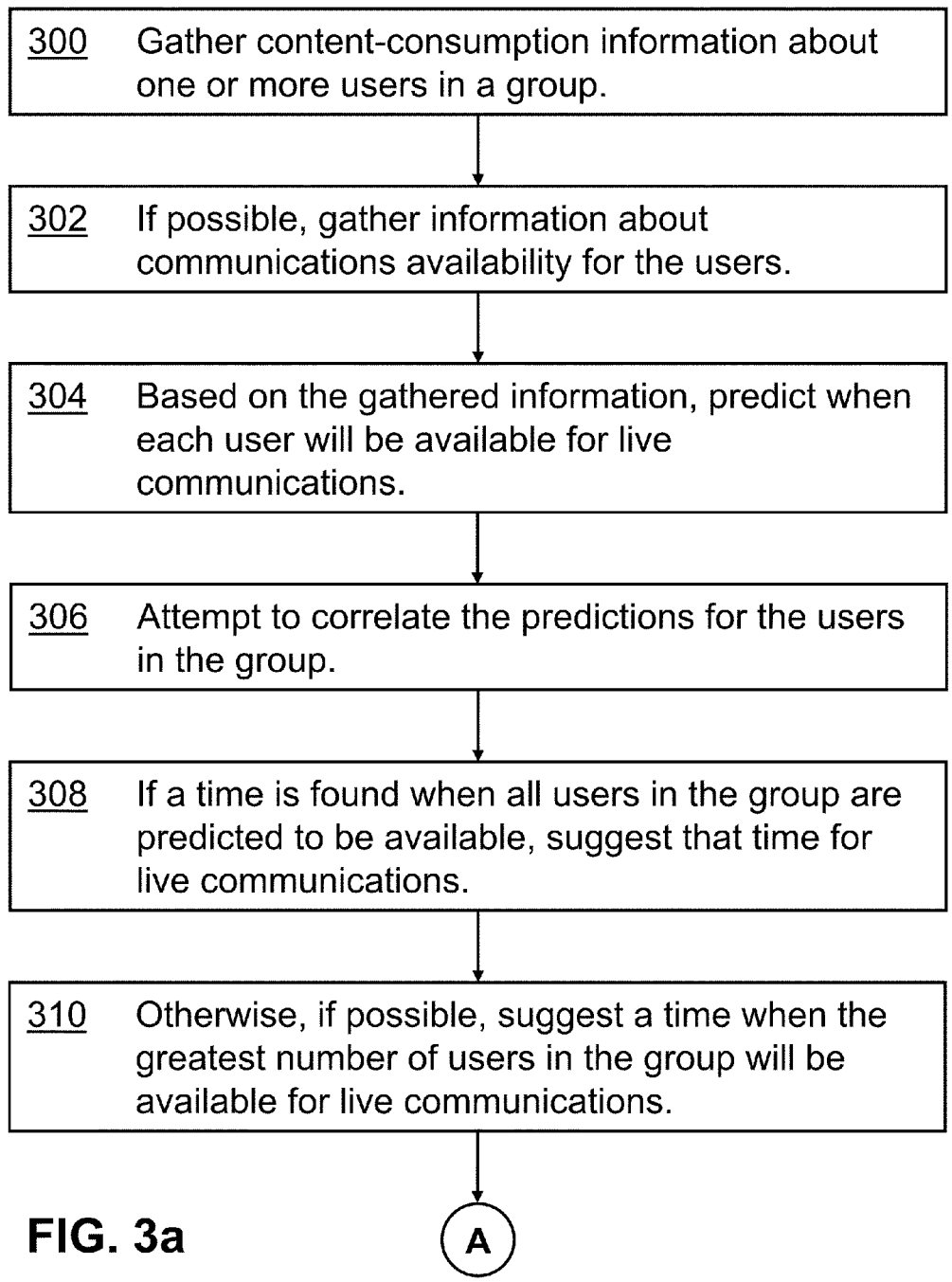
FIGS. 3a and 3b together are a flowchart of a method for suggesting a time for live communications.
Figure 3A:
Figure 3B:
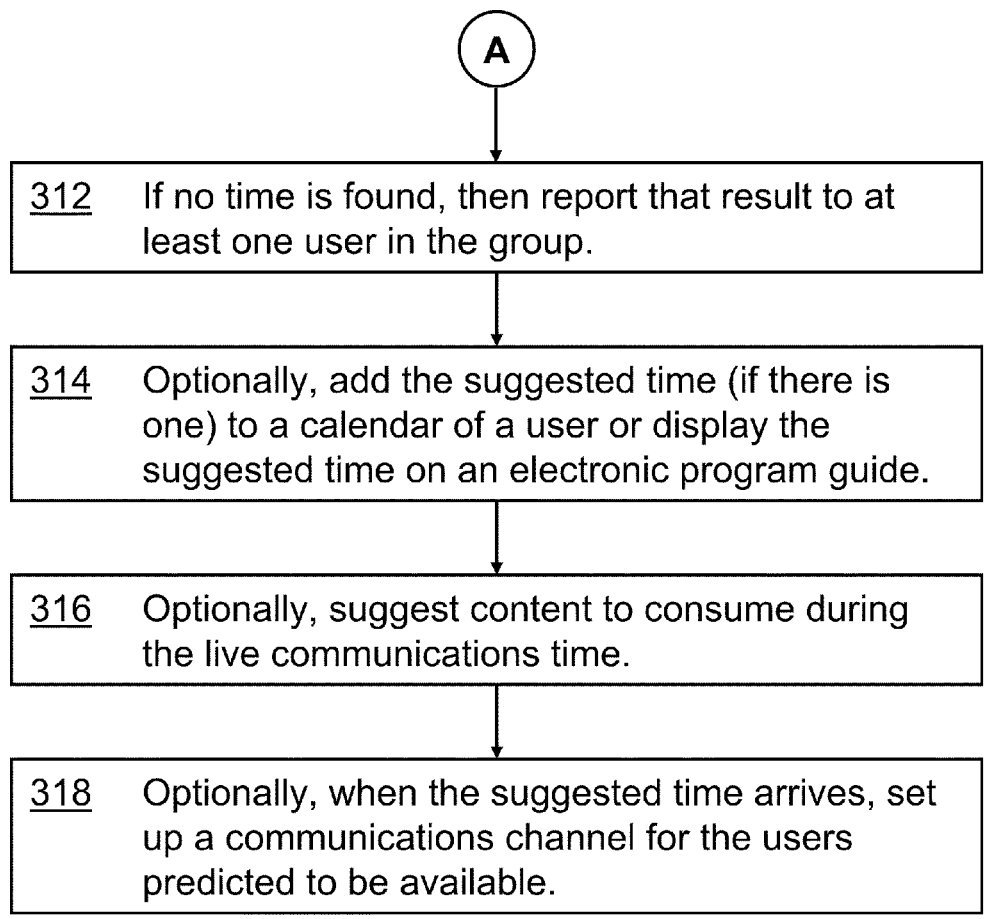

The method of FIGS. 3a and 3b illustrates one way in which aspects of the present invention may be practiced. In step 300, content-consumption information is gathered about users in the group. This information can include, for example, what types of content each user consumes and when and where that content is consumed. The content can include, for example, live or recorded television or radio programs, music, web services, telephone conversations, and the like. Different devices are expected to have different capabilities for gathering this information. As one example, a simple power monitor can report when the television monitor 110 is turned on but cannot tell what program is playing. The set-top box 108, on the other hand, both mediates commands to the cable system and delivers the resulting programming to the monitor 110, so the set-top box 108 can collect very detailed information on the media that the user consumes. However, most set-top boxes 108 cannot tell whether or not the television monitor 110 is actually turned on. The laptop 112 can also collect such information. When used as a web browser, a cellphone (not shown in FIG. 1) can collect the same information as the laptop 112. The cellphone can also record information from more traditional telephone services, from on-device content-consumption applications, and from on-device communication-centric applications.

Step 302 presents the possibility of gathering information in addition to the media-consumption information of step 300. This other information is directed toward predicting the communications availability of the user. For example, the user may keep an electronic calendar on the laptop 112. Certain events on the calendar (e.g., a business call) clearly show that the user will not be available for social communications, while other events (e.g., an entry for a baseball game) indicate the user is most likely available.

As mentioned above in reference to step 300, different media-consumption and communication devices are able to record different types of information about the user. In general, the suggestions made by aspects of the present invention are more useful the more information, and the more types of information, are gathered and analyzed. Further, the longer the period over which information is gathered, the better the particular habits of a user can be known.

In step 304, the information gathered about a user is analyzed to predict when that user will be available for live communications. As can easily be imagined, these predictions may be solid or very tentative depending upon the type and amount of information gathered, and also upon the regularity of the user's habits. In some situations, a user may explicitly state that he will either be busy or available at a certain time, or that he will tentatively be busy.

In order to make an accurate prediction in step 304, information from several of the user's devices should be gathered together for analysis. Different embodiments perform this gathering and analyzing differently, the embodiments depend upon different capabilities of devices and also on differing levels of concerns for privacy. For example, the set-top box 108 is centrally located among the user's devices in the environment 100 of FIG. 1, making it a good candidate for gathering and analyzing the information. However, for security's sake, the set-top box 108 should be shielded from "snooping" by the cable operator. In some embodiments, other user devices, e.g., a cellphone, can periodically download information gathered in steps 300 and 302 to the set-top box 108 via a short-range radio link.

Step 306 attempts to correlate the predictions made in step 304 across all users in the social group. In some embodiments, this correlation may be very simplistic and will just produce a list of times when all users (or a majority of users) in the group appear to be available. Other embodiments may limit the results of the correlation to predicted times when all (or a majority) of the users are predicted to be engaged in similar activities (e.g., all watching television or all watching the same television program). In other embodiments, the users can rate various media, and the correlation can be restricted to only those times when media rated above a certain threshold by a certain number of users will be available for consumption.

Step 306 can be performed in a distributed manner among devices (e.g., laptops 112) owned by the users in the group. Other implementations may choose to use a central server (e.g., the server 104) to correlate the individuals predictions made in step 304. These choices are made based on ease of implementation and on security considerations.

In step 308, the correlation of step 306 finds a time when all users in the group appear to be available for live communications. That time is then suggested to the users.

If no such time is found in step 308, then step 310 suggests a time when at least some of the users are expected to be available. The suggestions of step 310 can be limited to only times when, for example, a majority of users are expected to be available.

It may happen, of course, that the correlation of step 306 does not find any time. This eventuality is reported in step 312. It is possible that a user, seeing this result, can change his information collected in steps 300 and 302 (e.g., by freeing up some time on his electronic calendar). This change would affect the predictions in step 304 and, possibly, the correlation results of step 306.

There are many ways to present the suggested time to the users. In step 314, the suggested time can be added to an electronic calendar of a user or added to a on-screen program guide for viewing on the television monitor 110.

Information related to the suggested time can also be presented. Some embodiments list the users in the group who are expected to be available at the suggested time. In optional step 316, content is suggested for consumption during the suggested time. (This content suggestion may be based on ratings previously produced by users in the group.)

Optional step 318 sets up a communication channel at the suggested time. The channel may be a simple telephone call or a laptop-based meeting supporting voice and data communications. Some cable-television environments provide a communications channel that supports voice and video mediated by the set-top box 108 and the television monitor 110

(along with a microphone and camera, of course) and carried by the cable 106. The channel can be set up among those users expected to be available (or who have responded positively to an entry for this time added to their electronic calendars) and can also include users in the group who, though not expected to be available, are not positively known to be unavailable. These latter users can be invited by others in their social group to participate, if they are indeed available at this time.

It is anticipated that the method of FIGS. 3a and 3b is not performed only once but is repeated to gather more information and to suggest future times for live social interaction.

In view of the many possible embodiments to which the principles of the present invention may be applied, it should be recognized that the embodiments described herein with respect to the drawing figures are meant to be illustrative only and should not be taken as limiting the scope of the invention. For example, other media-consumption and communications devices are contemplated. Therefore, the invention as described herein contemplates all such embodiments as may come within the scope of the following claims and equivalents thereof.

We claim:

1. A method for suggesting a time for live communications among a plurality of users, the method comprising:
   for at least one of the users, collecting content-consumption-time information for the user;
   for each of the other users of the plurality of users, collecting either content-consumption-time information or communications-availability information for that user;
   based, at least in part, on the collected content-consumption-time information and on the collected communications-availability information, if any, predicting, for each of the plurality of users, a time when that user will be available for communications, the prediction based on more than content;
   attempting to correlate the predicted communications-availability times for the plurality of users; and
   if the correlating produces at least one predicted live-communications-availability time shared among the plurality of users, then presenting to at least one user a predicted live-communications-availability time;
   else if the correlating produces no predicted live-communications-availability time shared among the plurality of users but produces at least one predicted live-communications-availability time shared among a plural but proper subset of the plurality of users, then presenting to at least one user a predicted live-communications-availability time;
   else if the correlating produces no predicted live-communications-availability time shared among a plurality of the users, then informing at least one user of this result;
   wherein if the correlating produces no predicted live-communications-availability time shared among the plurality of users but produces a plurality of predicted live-communications-availability times each shared among a plural but proper subset of the plurality of users, then presenting to at least one user a predicted live-communications-availability time that is shared among a largest subset of the plurality of users.

2. The method of claim 1 wherein collecting content-consumption-time information is based, at least in part, on an element selected from the list consisting of: monitoring power usage of a content-consumption device, monitoring commands sent to a content-consumption device, and monitoring delivery of content to a content-consumption device.

3. The method of claim 1 wherein the content-consumption-time information is selected from the group consisting of: live television viewing time, stored video viewing time, live radio listening time, and stored music listening time.

4. The method of claim 1 wherein predicting is further based on an electronic calendar of a user.

5. The method of claim 1 wherein correlating is restricted to users within a social network.

6. The method of claim 5 wherein presenting comprises presenting to at least one user a list of other users within the social network who are predicted to share the presented live-communications-availability time.

7. The method of claim 1 wherein correlating is restricted to predicted times wherein a plurality of users are predicted to consume content on the same type of content-consumption device.

8. The method of claim 1 wherein correlating is restricted to predicted times wherein a plurality of users are predicted to consume the same content.

9. The method of claim 1 wherein presenting comprises adding the predicted live-communications-availability time to an electronic calendar of a user.

10. The method of claim 1 wherein presenting comprises displaying the predicted live-communications-availability time on an electronic program guide of a user.

11. The method of claim 1 wherein presenting comprises presenting potential content for consumption during the predicted live-communications-availability time.

12. The method of claim 1 wherein presenting occurs on a device other than a predicted content-consumption device.

13. The method of claim 1 further comprising:
   collecting content-rating information assigned by each of a plurality of users;
   wherein correlating is restricted to predicted times for consuming content rated above a threshold by a plurality of users.

14. The method of claim 1 further comprising:
   presenting the predicted live-communications-availability time to one of the users who is not predicted to be consuming content during the predicted live-communications-availability time.

15. The method of claim 1 further comprising:
   opening a communication channel between at least two users who are predicted to be available during the predicted live-communications-availability time.

* * * * *